Figure 9:
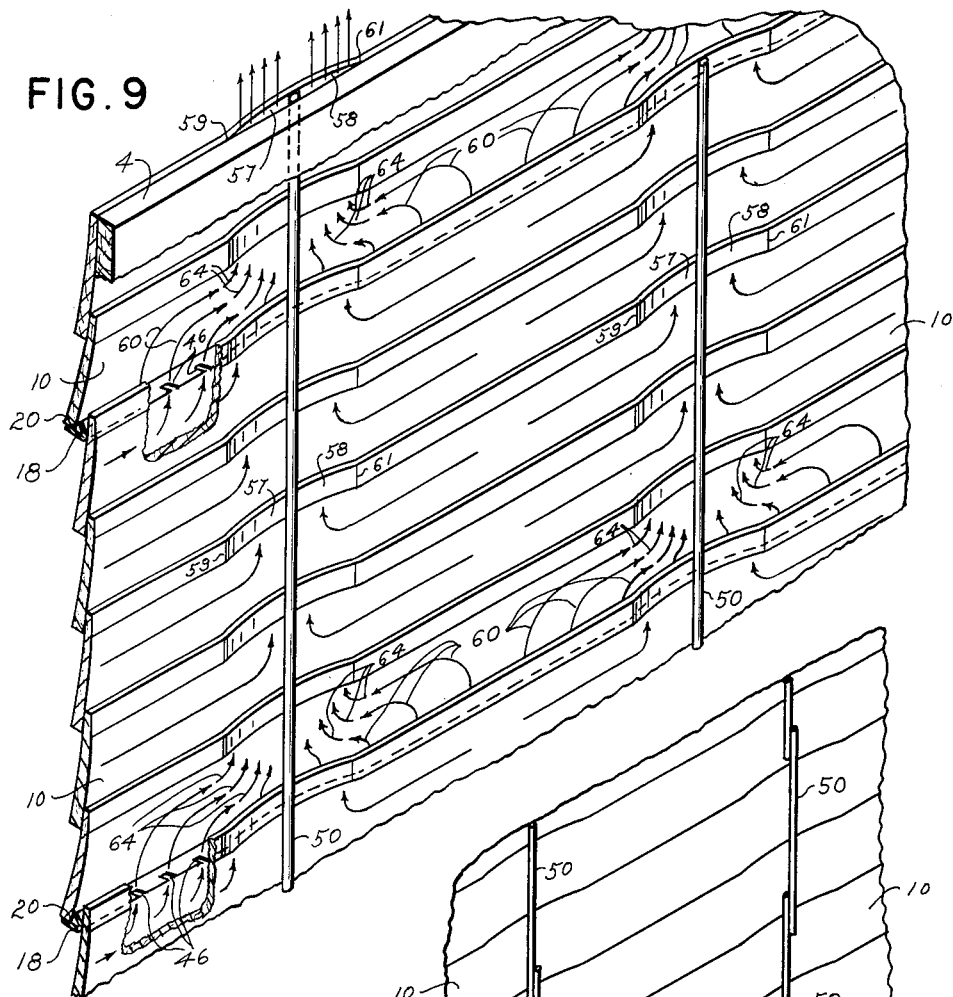

Sept. 7, 1965 T. E. OSBORN 3,204,379
VENTILATED BUILDING CONSTRUCTION AND METHOD
OF VENTILATING BUILDINGS
Filed July 2, 1959 6 Sheets-Sheet 1
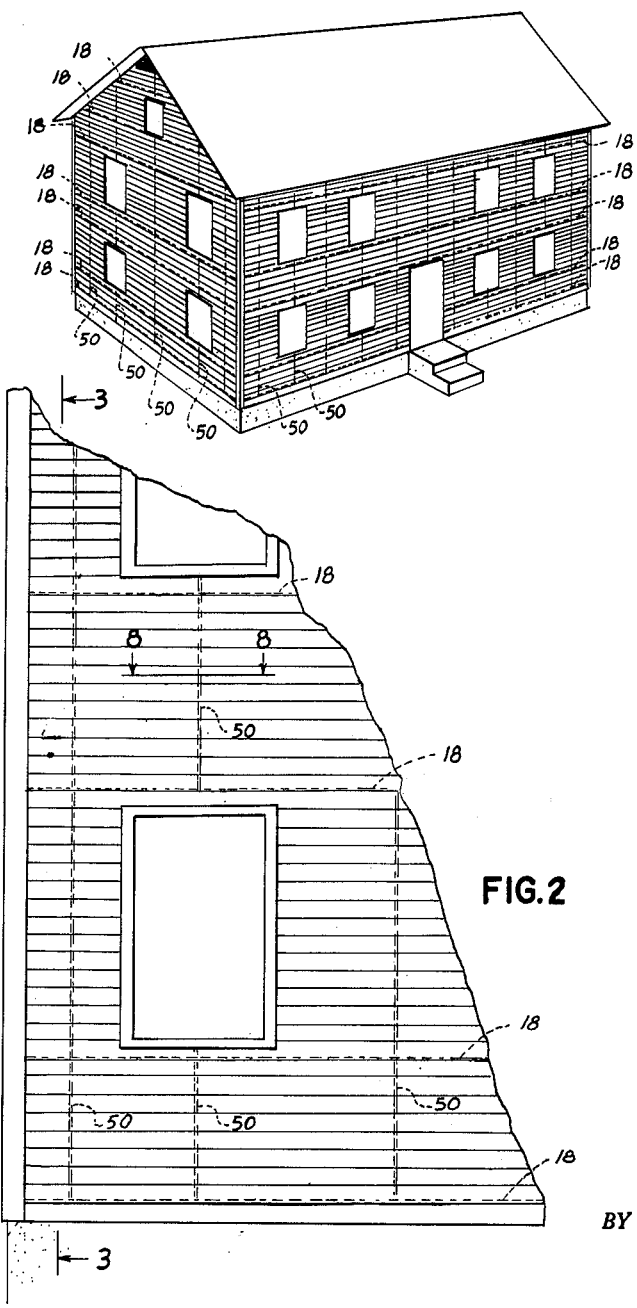
INVENTOR.
Thomas E. Osborn
BY Rines and Rines
ATTORNEYS

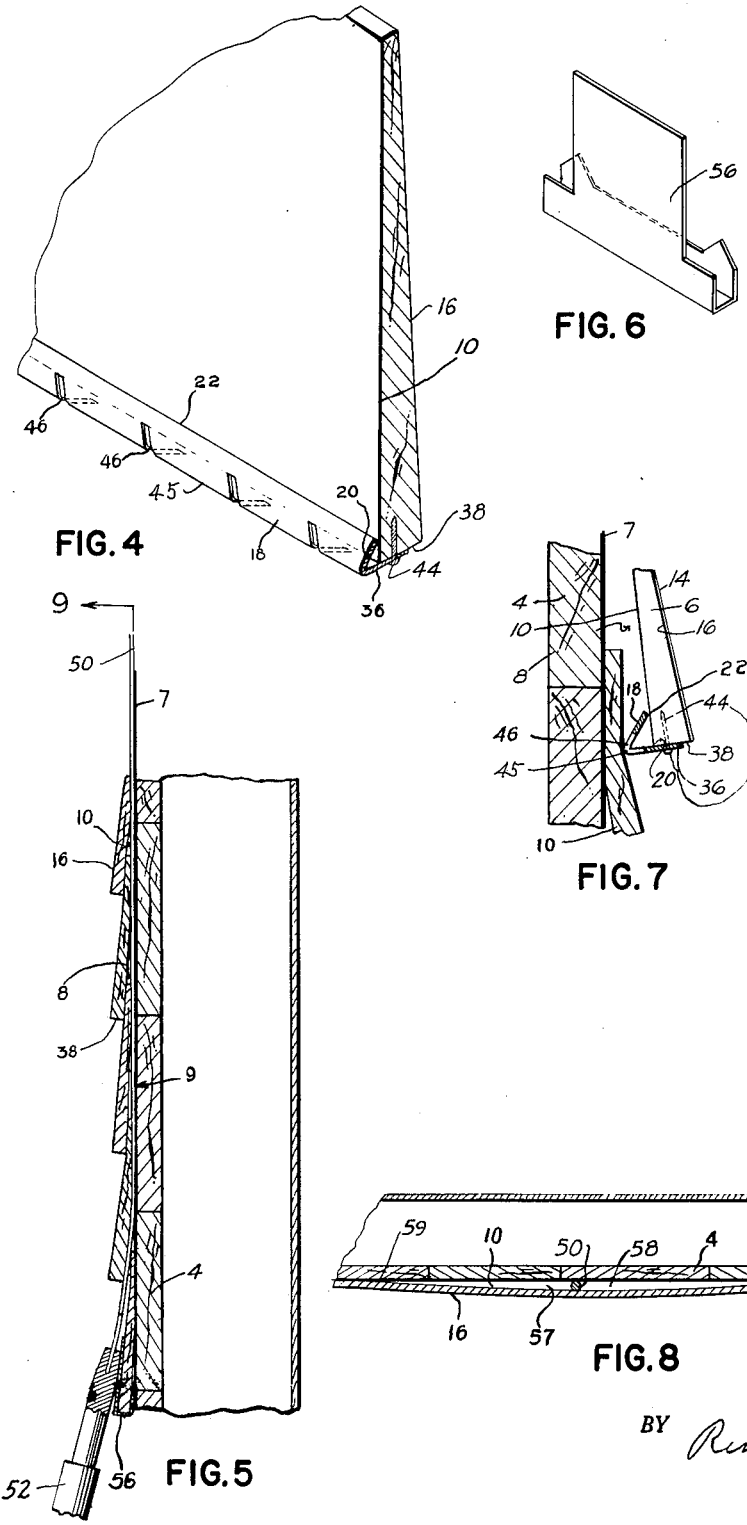

Sept. 7, 1965 T. E. OSBORN 3,204,379
VENTILATED BUILDING CONSTRUCTION AND METHOD
OF VENTILATING BUILDINGS
Filed July 2, 1959 6 Sheets-Sheet 3

INVENTOR.
Thomas E. Osborn
BY Rines and Rines
ATTORNEYS

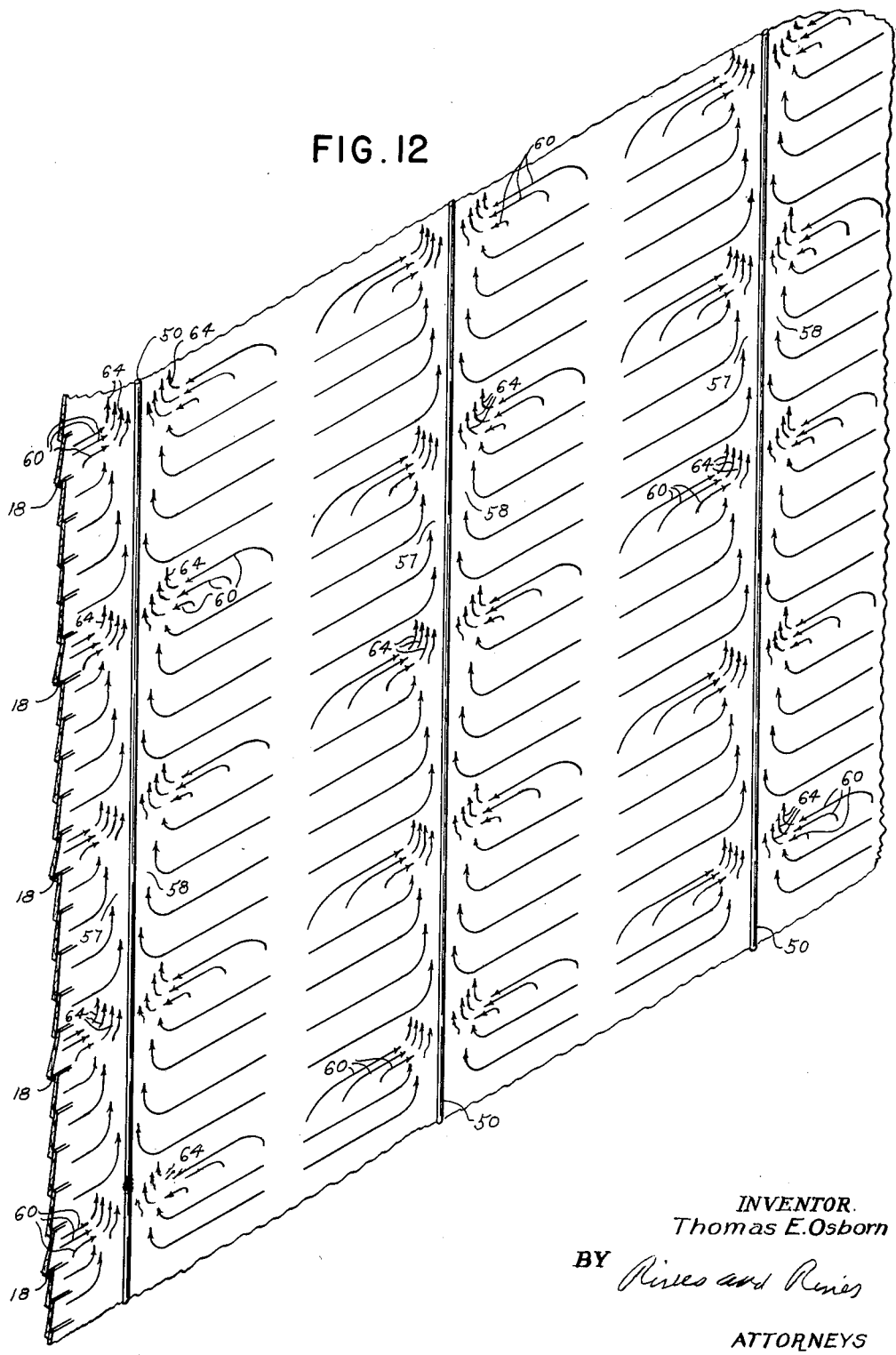

Sept. 7, 1965 T. E. OSBORN 3,204,379
VENTILATED BUILDING CONSTRUCTION AND METHOD
OF VENTILATING BUILDINGS
Filed July 2, 1959 6 Sheets-Sheet 5
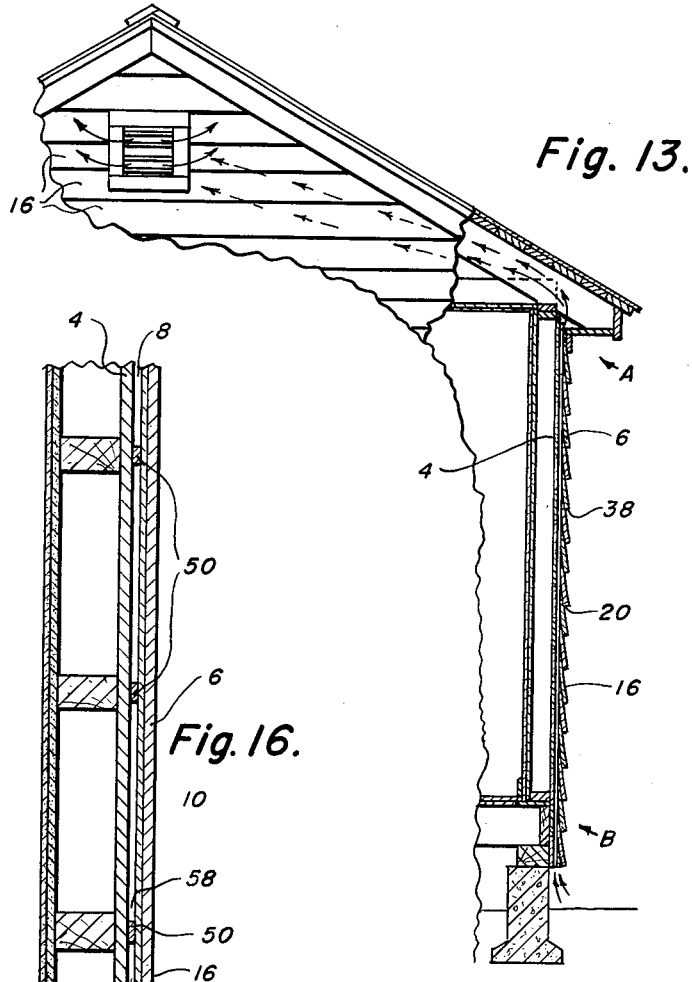
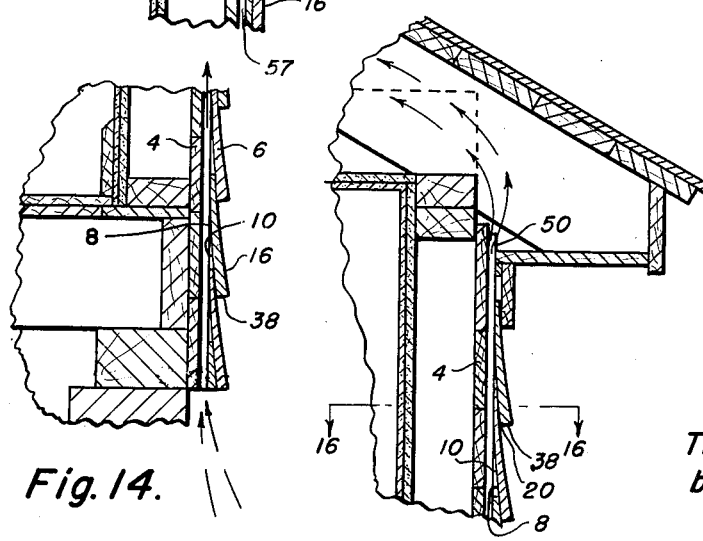
Inventor
Thomas E. Osborn
by
Attorneys Sept. 7, 1965 T. E. OSBORN 3,204,379
VENTILATED BUILDING CONSTRUCTION AND METHOD
OF VENTILATING BUILDINGS
Filed July 2, 1959 6 Sheets-Sheet 6
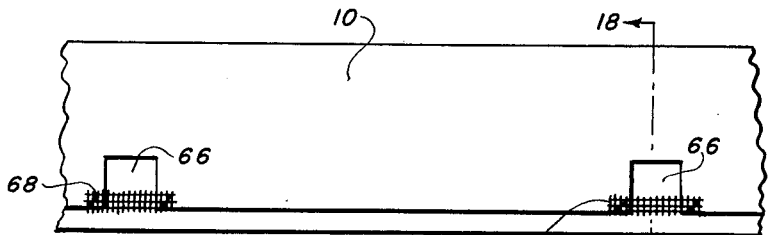 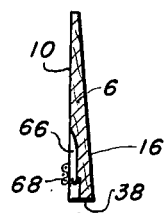
Fig. 17. Fig. 18.
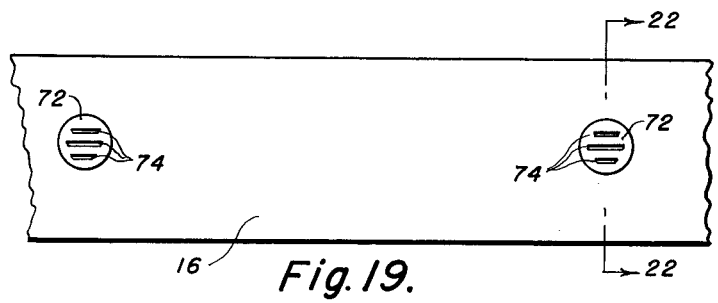 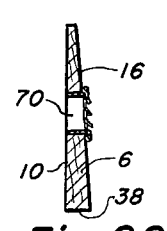
Fig. 19. Fig. 22.
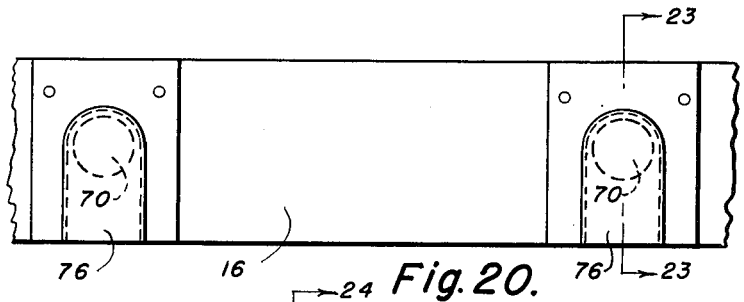 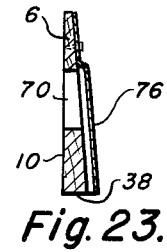
Fig. 20. Fig. 23.
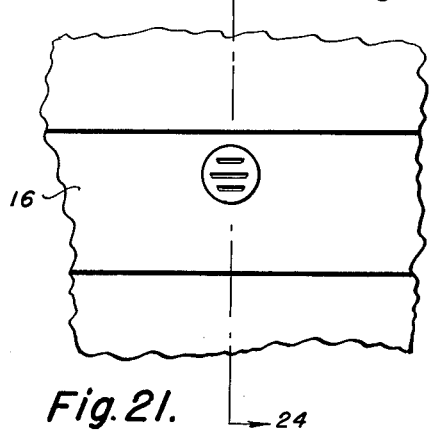 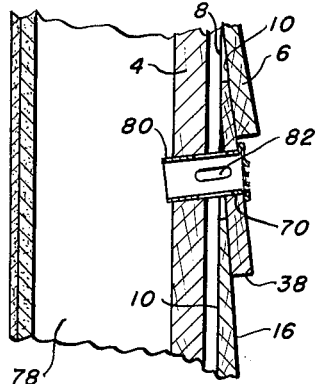
Fig. 21. Fig. 24.
Inventor
Thomas E. Osborn
by
Attorneys United States Patent Office 3,204,379
Patented Sept. 7, 1965

3,204,379
VENTILATED BUILDING CONSTRUCTION AND
METHOD OF VENTILATING BUILDINGS
Thomas E. Osborn, Lexington, Mass.
(60 Irving St., Watertown, Mass.)
Filed July 2, 1959, Ser. No. 824,699
20 Claims. (Cl. 52—305)

The present invention relates to ventilating building constructions, such as sidings of lapped clapboards, and to methods of ventilating buildings, for the purpose of preserving the paint thereon. The present application is a continuation-in-part of application, Serial No. 601,500, filed August 1, 1956, now abandoned.

The forces operating to destroy this paint have been known for many years. They originate principally in the moisture that collects, for one reason or another, in the spaces behind the clapboard siding, between the clapboards and the wall sheathing or wall-sheathing paper on which they are disposed. The moisture in this space first condenses on the rear faces of the clapboards, and then seeps or permeates through the wood of the clapboards to the inner surface of the paint on the outside of the clapboards. The paint then loosens, blisters, cracks and peels. A further disadvantage of this moisture is that it hastens the rotting of the clapboards.

The cause of the destruction of the paint being known, it has for many years been recognized also how to remove that cause. All that is necessary is to remove the moisture that collects in the spaces behind the siding.

Many proposals have accordingly been made, over the years, for ventilating those spaces. They have not, however, proved to be wholly satisfactory.

An object of the present invention, therefore, is to provide a new and improved building construction for providing a superior ventilating effect.

A further object is to provide a new and improved method of ventilating the moisture-collecting spaces of buildings.

Other and further objects will be explained hereinafter and will be particularly pointed out in the appended claims.

With the above ends in view, a feature of the invention resides in providing a ventilating space vented to the atmosphere between the wall sheathing and each of a plurality of vertically spaced clapboards, without any such ventilating spaces open to the atmosphere between the wall sheathing and the other clapboards. The ventilating spaces thus provided are continuously connected together through the medium of additional non-horizontal, preferably vertical ventilating spaces provided behind the clapboards, between these clapboards and the wall sheathing. These additional ventilating spaces may, for example, be obtained by driving dowels or other members in behind the clapboards, between the clapboards and the wall sheathing. By spacing the said spaces vented to the atmosphere and the dowels closely enough, the said ventilating spaces may be caused to communicate effectively with the non-horizontal ventilating spaces. Effective ventilation may thus be obtained throughout the wall of the building, from the ground to the attic.

Figure 11:
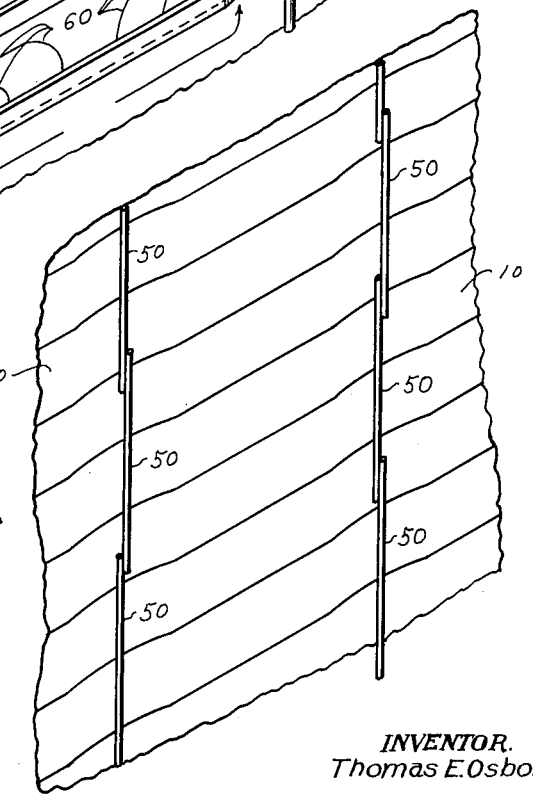
Figure 10:
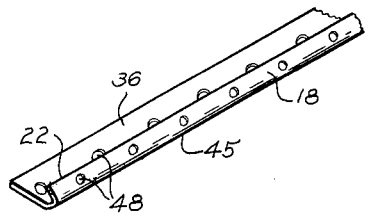

The invention will now be more fully described in connection with the accompanying drawings, in which FIG. 1 is a diagrammatic isometric view of a house in which the present invention is embodied; FIG. 2 is a fragmentary elevation of the same, on a larger scale; FIG. 3 is a vertical section, taken upon the line 3—3 of FIG. 2, looking in the direction of the arrows; FIG. 4 is a fragmentary isometric view, upon a still larger scale, of a clapboard with one form of siding ventilator mounted thereon; FIG. 5 is a fragmentary vertical section similar to FIG. 3, but upon a larger scale, illustrating a process step of inserting a dowel between the clapboard siding and the wall sheathing of the house; FIG. 6 is an isometric view of a protective guard used in the process illustrated by FIG. 5; FIG. 7 is a fragmentary vertical section showing an overlapping clapboard and the said form of ventilator siding thereon, mounted in place on an overlapped clapboard; FIG. 8 is a horizontal section, taken upon line 8—8 of FIG. 2, looking downward, in the direction of the arrows, but upon a larger scale; FIG. 9 is an isometric fragmentary rear view of a clapboard siding, shown detached from the sheathing of the house, substantially upon the line 9—9 of FIG. 5, but showing the said form of siding ventilator mounted in place, and showing also dowels for improving the ventilation; FIG. 10 is an isometric view of a modified siding ventilator; FIG. 11 is a fragmentary view, similar to FIG. 9, illustrating the dowels as staggered; FIG. 12 is a fragmentary view, similar to FIG. 9, but upon a somewhat smaller scale, to permit of illustrating more of the ventilating paths; FIG. 13 is a vertical section somewhat similar to FIG. 3, but upon a larger scale, of a modification; FIGS. 14 and 15 are fragmentary enlarged detail views, upon a still larger scale, showing details of construction at the ground and the roof, respectively, of the modification illustrated by FIG. 13; FIG. 16 is a section taken upon the line 16-16 of FIG. 15 looking downward, in the direction of the arrows; FIG. 17 is a fragmentary rear elevation of a clapboard embodying a different form of siding ventilator; FIG. 18 is a vertical section, taken upon the line 18-18 of FIG. 17, looking in the direction of the arrows; FIGS. 19, 20 and 21 are fragmentary front views of clapboards embodying still different forms of siding ventilator; and FIGS. 22, 23 and 24 are vertical sections, taken upon the lines 22—22, 23—23 and 24—24, of FIGS. 19, 20 and 21, respectively, FIG. 24 being upon a larger scale.

A wall of a conventional house is shown surfaced by a paper-covered or otherwise-covered wall sheathing 4 on which is constructed a siding, shown constituted of clapboards 6. The covering, whether of paper or other material, such as felt, aluminum foil, building paper, tarred felt or the like, is shown exaggerated at 7, in FIGS. 5 and 7, but is omitted from the other figures. The term "wall sheathing" will be employed generically herein after to include the covering 7, if present. The invention is not, of course, restricted to use with sidings constituted of clapboards, but the illustrated clapboard siding will serve for the purpose of explaining the invention.

In buildings of this character, moisture collects in the space 8, shown more particularly in FIGS. 5, 7, 14, 15, 16 and 24, between an overlapping clapboard and an overlapped clapboard of a pair of clapboards. Since this space 8 between the pair of overlapping and overlapped clapboards is completely enclosed, the moisture that collects therein can not escape. This moisture, therefore, condenses upon the rear faces 10 of the clapboards, and then works its way, or permeates by capillary action, through the wood of the clapboards, to the inner surface of the coating 14 of paint, shown, in FIG. 7 only, on the outer faces 16 of the clapboards. The water that thus collects between these outer faces 16 of the clapboards and the inner surfaces of the coating 14 of paint produces blisters. The paint then cracks and peels.

This is prevented, according to the form of the invention illustrated by FIGS. 1 to 12, inclusive, by inserting a siding ventilator 18 between the lower inner edge 20 of an overlapping clapboard and the clapboard that it overlaps of a pair of overlapping clapboards. This results, as shown more particularly in FIGS. 7 and 9, in widening out the space 8 between this overlapping clapboard and this overlapped clapboard, and, to some extent, opening this space 8 to the atmosphere. The space 8 thereupon becomes converted, therefore, from an enclosed space to a substantially horizontally disposed open ventilating space between the overlapping clapboard and the overlapped clapboard of the pair of clapboards.

The moisture in this ventilated space 8 will therefore no longer condense upon the rear face 10 of the clapboard. It will work its way out into the atmosphere. It will no longer, therefore, ooze through the wood of the clapboard to the inner surface of the coating 14 of paint on the outer surface 16 thereof.

The siding ventilator 18 is shown, in preferred form, as comprising an elongated substantially dihedral-shaped strip of metal, substantially V-shaped in transverse cross-section. Aluminum is preferred, because of its lightness and rust-resisting properties. The lower rear or inner edge 20 of the overlapping clapboard is shown inserted in the dihedral angle or V of the siding ventilator 18. The ventilator is shown so mounted upon the overlapping clapboard that one face 36 of the dihedral angle or V is positioned against the bottom surface 38 of the overlapping clapboard. This face 36 of the dihedral angle is shown wider than the other face thereof, in order to provide a space for driving nails or other securing members 44 therethrough into the bottom surface 38 of its overlapping clapboard. The rear face 10 of the overlapping clapboard is shown resting against the edge 22 of the narrow face of the dihedral angle. The ventilator 18 may, however, be held in place even without these securing members 44. The inner edge of the strip, represented by the edge 45 of the dihedral angle, at the corner of the V, is shown resting upon the overlapped clapboard, thus maintaining the overlapping and overlapped clapboards of the pair of clapboards permanently separated, in order to provide the before-described open horizontally disposed ventilating space between them.

The siding ventilator 18 is shown provided with perforations through which the ventilating space may communicate with the outside atmosphere to improve the ventilation of this ventilating space. The perforations may be of any desired shape. They are shown elongated, at 46, and as extending along both faces of the dihedral angle or V. They may be also circular, however, as shown at 48, in FIG. 10, and as disposed in the different faces of the dihedral angle or V. They may also have other shapes and locations. The perforations permit air to pass freely in and out of the horizontally disposed ventilating space, thus increasing the effectiveness of the ventilation, and thereby minimizing the opportunity for moisture to collect upon the rear faces 10 of the clapboards.

Siding ventilators 18 as above described, constituted of sheet aluminum, have been used successfully 4 feet long, the faces of which were ⅝ and ⅜ inch wide. Ventilators with faces of ⅞ and ¼ inch width have also been employed. The dihedral angle or V was formed by bending a sheet-aluminum strip to an angle in the neighborhood of 45 degrees. The elongated apertures 46 were inclined to the direction of length about 60 degrees, and they extended to within ¼ and ⅛ inch from the edges. Circular apertures 48 employed were ¹⁄₁₆ inch in diameter.

Though very effective ventilation is provided by the siding ventilator 18, it is undesirable to use this ventilator between the overlapping and overlapped clapboards of each pair of clapboards. According to a further feature of the present invention, therefore, the ventilators 18 are employed between vertically spaced pairs of lapped clapboards, say, between the lapped clapboards of every eighth or tenth pair of lapped clapboards, and provision is made for providing communicating ventilating spaces between them. In FIGS. 9 and 12, for illustrative purposes, the ventilators 18 are shown disposed between every five pairs of clapboards.

According to the preferred embodiment of the invention herein illustrated and described, small regions of the clapboards positioned between every pair of these fifth, eighth and tenth pairs of clapboards are forced out, away from the wall sheathing 4 or wall-sheathing paper 7, by means of solid members 50, shown as dowels or flat strips, driven in between the clapboard siding and the wall sheathing 4. If dowels are employed, they may be constituted, for example, of wood, metal, such as aluminum, plastic or any other desired substances. If flat strips are employed, they may be constituted, for example, of pressboard or Masonite strips, 3 to 4 feet long, 1 inch wide and ⅛ inch thick. They may be 14 to 16 inches apart. Additional communicating non-horizontally disposed ventilating spaces are thus provided in the regions of location of these strips.

A preferred process of driving the dowels 50 is illustrated in FIG. 5. The upper end of the dowel, which may preferably be tapered (not shown), is shown in FIG. 5 inserted between an overlapping clapboard and an overlapped clapboard of a pair of clapboards. The overlapping clapboard must be temporarily separated from the overlapped clapboard of the pair, as with the aid of a hammer, not shown, to permit such insertion. The lower end of the dowel 50 is inserted in an upper recess of a tool 52, and force is applied at the bottom end of the tool, as by hammering, hydraulic pressure, or in any other desired way. The length of the dowel may be about 30 inches, and its diameter about ⅜ of an inch. In many cases, with a dowel 50 of this diameter, it is desirable to support its upper and middle portions, during the process of driving it in place, by enclosing it in a metal tube, not shown. In order to protect the overlapped clapboard from injury during this driving process, it may be enclosed in a guard 56, illustrated in FIGS. 5 and 6.

The flat strips may be inserted also by merely loosening the clapboards, and pushing the strips in upward, by hand, sometimes tapping upon the bottoms of the flat strips.

The dowels 50 may be driven in place, one after another, to provide continuous, preferably vertical ventilating spaces 57 and 58 on each side thereof, between the clapboards and the wall sheathing 4. The spaces 57 are shown extending between the dowels 50 and vertically disposed lines 59 and the spaces 58 as extending between the dowels 50 and the vertically extending lines 61. In FIGS. 9 and 12, the dowels 50 are shown alined vertically. In practice, however, they will usually be staggered, as shown in FIG. 11. The ventilating spaces may extend throughout the height of the building, from the ground to the attic. It is preferred to drive the dowels 50 in regions close to the nails that secure the clapboards in place, as this provides ventilating spaces 57 and 58 of greater width, and reduces the number of dowels 50 employed. The ventilators 18 will normally be secured in place after the dowels 50 have been driven into place.

It is found, in practice, that, if the ventilators 18 are spaced close enough to one another, as at every tenth pair of overlapping and overlapped clapboards, the open horizontally disposed ventilating spaces provided thereby between the vertically spaced pairs of clapboards will communicate very effectively with the non-horizontally disposed ventilating spaces 57 and 58 provided by the dowels 50, to provide very effective continuous ventilation between them. With the ventilators 18 and the ventilation spaces 8 in which they are respectively disposed positioned thus close to one another, of course, the spaces 57, 58 are naturally and inherently positioned so close to the ventilating spaces 8 adjacent thereto as to facilitate the effecting of the same purpose of very effective continuous ventilation between them. In this manner, continuous ventilation becomes provided throughout the vertical extent of the building, throughout its height, from the ground to the attic, with the use of a minimum number of siding ventilators 18.

The continuous ventilation is illustrated by the arrows of FIGS. 9 and 12. In FIG. 9, the scale is so large as to permit of showing only two ventilators 18. The scale is reduced in FIG. 12, to permit of showing a larger number of ventilators 18, and also a larger number of spaces 57 and 58.

In FIGS. 9 and 12, air is shown entering at each of of the ventilators 18, into the horizontally disposed ventilating space provided thereby, as indicated by the arrows 60. These arrows 60 indicate the paths of the air through the apertures 46 or 48 of the ventilators 18. The air then becomes deflected upward into the ventilating spaces 57 and 58, as indicated by the arrows 64. A continuous horizontal and vertical network of communicating ventilating spaces is thus provided, from the ground to the attic, as illustrated by FIGS. 9 and 12.

It will also be understood that the ventilators 18 need not extend throughout the width of the wall of the building, and that very satisfactory results may be obtained even if they extend part way along the wall. It will further be understood that the ventilators 18 may be staggered vertically, instead of being continually disposed along the same horizontal lines. It will be understood also, as before suggested, that the dowels 50 will provide the ventilating function even if they are not strictly vertically disposed; it is sufficient if they are disposed substantially non-horizontally to provide substantially non-horizontally disposed ventilating spaces 57 and 58. It will further be understood that the advantages of the feature of the invention relating to the production of the upwardly deflected drafts of air, through the employment of the dowels or strips 50 or their equivalent, may be obtained even without the aid of the siding ventilators 18 or their equivalent, as illustrated by the modification of FIGS. 13 to 16. As illustrated more particularly by FIG. 13, the upward drafts of air may extend throughout the complete height of the building, from near the ground level, as indicated by the lowermost arrows, at B, to the garret, as indicated by the uppermost arrows, at A.

The invention is not, however, restricted to use with the particular siding ventilators shown at 18. The invention may be practiced also with the aid of other types of siding ventilators, as well. This is illustrated by FIGS. 17 to 24, inclusive.

In FIGS. 17 and 18, the lower rear or inner edge 20 of each of a plurality of spaced clapboards is routed or channeled, at horizontally spaced points, as shown at 66. The spaces 8 are thus vented to the atmosphere without the use of the siding ventilators 18, but merely through the channels 66. Wire mesh 68 may be employed to prevent the entry of insects and other foreign matter into the ventilated spaces 8.

According to the modifications shown in FIGS. 19 to 24, inclusive, the vertically spaced clapboards may be intermediately perforated, as shown at 70. In the modifications of FIGS. 19 and 22, metal tubes 72 are shown inserted into the perforations. The tubes are shown open at their inner or rear ends, but closed at their outer or front ends. The purpose of closing the outer or front ends of these tubes 70 is to prevent the ingress, in the ventilated spaces 8, of insects and other foreign substances. The closed ends are provided with openings 74, however, for ventilation purposes.

According to the modifications shown in FIGS. 20 and 23, greater ventilation is provided by not closing the perforators 70, which, however, are shielded against the direct entry of foreign bodies by means of metal shields 76.

Though, as before stated, the principal sources of the deleterious moisture are the spaces between the wall sheathing and the siding, some moisture collects also to the rear of, or behind, the wall sheathing 4, in the space shown at 78, FIG. 24. The siding ventilator 72, shown in FIGS. 19 and 22, may be lengthened, as shown at 80, to extend through the wall sheathing 4, and into the space 78. Side openings 82 communicate with the horizontally disposed ventilated spaces 8, in order to open these ventilated spaces 8 to the atmosphere, in addition to the ventilation provided by the lengthened siding ventilator 80 extending into the rear space 78.

Very effective ventilation is thus provided that enables the moisture between the clapboard siding and the sheathing 4 or the sheathing-wall paper 7 to escape into the atmosphere, thus preserving the paint and also preventing rotting of the wood of the clapboards.

Further modifications will occur to persons skilled in the art, and all such are considered to fall within the spirit and scope of the present invention, as defined in the appended claims.

What is claimed is:

1. A building construction comprising a wall sheathing, a siding of lapped clapboards on the wall sheathing, means separating the lower edge of the overlapping clapboard of each of a plurality of vertically spaced pairs of clapboards from the clapboard that it overlaps, the other lapped clapboards, disposed between the said vertically spaced pairs of clapboards, being unseparated, thereby to provide a substantially horizontally disposed ventilating space vented to the atmosphere between the clapboards of each of the said vertically spaced pairs of clapboards, but not between the said other lapped clapboards, and a plurality of substantially non-horizontally disposed members separating portions of the said other lapped clapboards from the wall sheathing to provide substantially non-horizontally disposed continuous ventilating spaces between the said other lapped clapboards and the wall sheathing, the substantially horizontally disposed ventilating spaces being close enough to one another to cause them to communicate effectively with the substantially non-horizontally disposed ventilating spaces in order to provide effectively continuous ventilation to the atmosphere through the substantially horizontally disposed and the substantially non-horizontally disposed ventilating spaces.

2. A method of providing ventilation between a wall sheathing and a siding of lapped clapboards mounted on the wall sheathing that comprises separating the lower edge of the overlapping clapboard of each of a plurality of vertically spaced pairs of clapboards from the clapboard that it overlaps while maintaining unseparated the other lapped clapboards, disposed between the said vertically spaced pairs of clapboards, thereby to provide a substantially horizontally disposed ventilating space vented to the atmosphere between the clapboards of each of the said vertically spaced pairs of clapboards, but not between the said other lapped clapboards, separating portions of the said other lapped clapboards substantially non-horizontally from the wall sheathing to provide substantially non-horizontally disposed continuous ventilating spaces between the said other lapped clapboards and the wall sheathing, and spacing the substantially horizontally disposed ventilating spaces close enough to one another to cause them to communicate effectively with the substantially non-horizontally disposed ventilating spaces in order to provide effectively continuous ventilation to the atmosphere through the substantially horizontally disposed and the substantially non-horizontally disposed ventilating spaces.

3. A building construction comprising a wall sheathing, a siding of lapped clapboards on the wall sheathing, and a siding ventilator comprising a substantially dihedral-shaped strip the transverse cross-section of which is an open V, the strip being disposed between a pair of lapped clapboards of the siding with the lower inner edge of the overlapping clapboard inserted in the open V, with the bottom surface of the overlapping clapboard resting against a face of the dihedral angle, with the inner face of the overlapping clapboard resting against the outer face of the dehedral angle, and with the edge of the dihedral angle resting against the overlapped clapboard to maintain the clapboards separated in order to provide a ventilating space between them.

4. A building construction comprising a wall sheathing, a siding of lapped clapboards on the wall sheathing, and a siding ventilator comprising a substantially dihedral-shaped strip the transverse cross-section of which is an open V, the strip being disposed between a pair of lapped clapboards of the siding with the lower inner edge of the overlapping clapboard inserted in the open V, with the bottom surface of the overlapping clapboard resting against a face of the dihedral angle, with the inner face of the overlappig clapboard resting against the outer face of the dihedral angle, and with the edge of the dihedral angle resting against the overlapped clapboard to maintain the clapboards separated in order to provide a ventilating space between them, the ventilator being provided with perforations through which the ventilating space may communicate with the outside atmosphere to improve the ventilation of the ventilating space.

5. A building construction comprising a wall sheathing, a siding of lapped clapboards on the wall sheathing, a plurality of substantially dihedral-shaped strips the transverse cross-section of each of which is an open V, the strips being each disposed between a pair of lapped clapboards of the siding with the lower inner edge of the overlapping clapboard inserted in the corresponding open V, the pairs of lapped clapboards being vertically spaced, the other lapped clapboards, disposed between the said vertically disposed pairs of clapboards, being unseparated, thereby to provide a plurality of substantially horizontally disposed ventilating spaces vented to the atmosphere between the clapboards of each of the said vertically spaced pairs of clapboards, but not between the said other lapped clapboards, and means separating portions of the said other lapped clapboards from the wall sheathing to provide substantially non-horizontally disposed continuous ventilating spaces between the said other lapped clapboards and the wall sheathing, the substantially horizontally disposed ventilating spaces being close enough to one another to cause them to communicate effectively with the substantially non-horizontally disposed ventilating spaces in order to provide effectively continuous ventilation to the atmosphere through the substantially horizontally disposed and the substantially non-horizontally disposed ventilating spaces.

6. A method of providing ventilation between a wall sheathing and a siding of lapped clapboards mounted on the wall sheathing that comprises separating the lower edge of the overlapping clapboard of each of a plurality of vertically spaced pairs of clapboards from the clapboard that it overlaps while maintaining unseparated the other lapped clapboards, disposed between the said vertically spaced pairs of clapboards, thereby to provide a substantially horizontally disposed ventilating space vented to the atmosphere between the clapboards of each of the said vertically spaced pairs of clapboards, but not between the said other lapped clapboards, driving a plurality of members substantially non-horizontally in between portions of the said other lapped clapboards and the wall sheathing to provide substantially non-horizontally disposed continuous ventilating spaces between the said other lapped clapboards and the wall sheathing, and spacing the substantially horizontally disposed ventilating spaces close enough to one another to cause them to communicate effectively with the substantially non-horizontally disposed ventilating spaces in order to provide effectively continuous ventilation to the atmosphere through the substantially horizontally disposed and the substantially non-horizontally disposed ventilating spaces.

7. A method of providing ventilation between a wall sheathing and a siding of lapped clapboards mounted on the wall sheathing that comprises providing a ventilating space vented to the atmosphere between the wall sheathing and a plurality of vertically spaced clapboards, but not between the wall sheathing and the other clapboards, driving a plurality of members substantially non-horizontally in between portions of the said other clapboards and the wall sheathing to provide substantially non-horizontally disposed continuous ventilating spaces between the said other clapboards and the wall sheathing, and spacing the ventilating spaces vented to the atmosphere close enough to one another to cause them to communicate effectively with the substantially non-horizontally disposed ventilating spaces in order to provide effectively continuous ventilation to the atmosphere through the ventilating spaces vented to the atmosphere and the substantially non-horizontally disposed ventilating spaces.

8. A building construction comprising a wall sheathing, a painted siding of lapped clapboards constituted of material that is permeable to moisture mounted on the wall sheathing, means providing a ventilating space vented to the atmosphere between the wall sheathing and the siding at each of a plurality of vertically spaced clapboards, there being no ventilating space open to the atmosphere between the wall sheathing and the other clapboards, a plurality of substantially non-horizontally disposed members separating portions of the said other clapboards from the wall sheathing to provide substantially non-horizontally disposed continuous ventilating spaces between the said other clapboards and the wall sheathing, the ventilating spaces vented to the atmosphere being close enough to one another and to the substantially non-horizontally disposed ventilating spaces disposed adjacent thereto to cause them to communicate effectively with the substantially non-horizontally disposed ventilating spaces in order to provide effectively continuous ventilation to the atmosphere through the ventilating spaces vented to the atmosphere and the substantially non-horizontally disposed ventilating spaces, and means venting the space behind the wall sheathing to the atmosphere, whereby moisture between the siding and the sheathing is prevented from destroying the paint on the siding.

9. A building construction comprising a wall sheathing, a painted siding of lapped clapboards constituted of material that is permeable to moisture mounted on the wall sheathing, a plurality of vertically spaced clapboards being perforated to provide ventilating spaces vented to the atmosphere between them and the wall sheathing, there being no ventilating space open to the atmosphere between the wall sheathing and the other clapboards, and a plurality of substantially non-horizontally disposed members separating portions of the said other clapboards from the wall sheathing to provide substantially non-horizontally disposed continuous ventilating spaces between the said other clapboards and the wall sheathing, the ventilating spaces vented to the atmosphere being close enough to one another and to the substantially non-horizontally disposed ventilating spaces disposed adjacent thereto to cause them to communicate effectively with the substantially non-horizontally disposed ventilating spaces in order to provide effectively continuous ventilation to the atmosphere through the ventilating spaces vented to the atmosphere and the substantially non-horizontally disposed ventilating spaces, whereby moisture between the siding and the sheathing is prevented from destroying the paint on the siding.

10. A building construction comprising a wall sheathing, a painted siding of lapped clapboards constituted of material that is permeable to moisture mounted on the wall sheathing, a plurality of vertically spaced clapboards being perforated to provide ventilating spaces vented to the atmosphere between them and the wall sheathing, there being no ventilating space open to the atmosphere between the wall sheathing and the other clapboards, a plurality of substantially non-horizontally disposed members separating portions of the said other clapboards from the wall sheathing to provide substantially non-horizontally disposed continuous ventilating spaces between the said other clapboards and the wall sheathing, the ventilating spaces vented to the atmosphere being close enough to one another and to the substantially non-horizontally disposed ventilating spaces disposed adjacent thereto to cause them to communicate effectively with the substantially non-horizontally disposed ventilating spaces in order to provide effectively continuous ventilation to the atmosphere through the ventilating spaces vented to the atmosphere and the substantially non-horizontally disposed ventilating spaces, and siding ventilators disposed in the perforations of the clapboards and venting the space between the wall sheathing and the clapboards and the space behind the wall sheathing to the atmosphere, whereby moisture between the siding and the sheathing is prevented from destroying the paint on the siding.

11. A building construction comprising a wall sheathing, a painted siding constituted of material that is permeable to moisture mounted on the wall sheathing, means providing a ventilating space vented to the atmosphere between the wall sheathing and the siding at each of a plurality of vertically spaced points of the building, there being no ventilating spaces open to the atmosphere between the wall sheathing and the siding at points other than the said vertically spaced points, and a plurality of substantially non-horizontally disposed members separating portions of the siding from the wall sheathing to provide substantially non-horizontally disposed continuous ventilating spaces between the siding and the wall sheathing at the said other points, the ventilating spaces vented to the atmosphere being close enough to one another and to the substantially non-horizontally disposed ventilating spaces disposed adjacent thereto to cause them to communicate effectively with the substantially non-horizontally disposed ventilating spaces in order to provide effectively continuous ventilation to the atmosphere through the ventilating spaces vented to the atmosphere and the substantially non-horizontally disposed ventilating spaces, whereby moisture between the siding and the sheathing is prevented from destroying the paint on the siding.

12. A method of providing ventilation between a wall sheathing and a siding mounted on the wall sheathing that comprises providing a ventilating space vented to the atmosphere between the wall sheathing and the siding at each of a plurality of vertically spaced points of the building, but not between the wall sheathing and the siding at points other than the said vertically spaced points, driving a plurality of members substantially non-horizontally in between portions of the siding and the wall sheathing to provide substantially non-horizontally disposed continuous ventilating spaces between the siding and the wall sheathing at the said other points, and spacing the ventilating spaces vented to the atmosphere close enough to one another to cause them to communicate effectively with the substantially non-horizontally disposed ventilating spaces in order to provide effectively continuous ventilation to the atmosphere through the ventilating spaces vented to the atmosphere and the substantially non-horizontally disposed ventilating spaces.

13. A method of providing ventilation between a wall sheathing and a painted siding constituted of material that is permeable to moisture mounted on the wall sheathing of a building that comprises separating portions of the siding from the wall sheathing at each of a plurality of vertically spaced points of the building, but not at points other than the said vertically spaced points, in order to provide vertically spaced ventilating spaces between the said portions of the siding and the wall sheathing at the vertically spaced points, but not at the said other points, opening the siding to the atmosphere at additional points between the vertically spaced points in order to permit the entry of ventilating air between the wall sheathing and the siding at the additional points, and spacing the vertically spaced points and the additional points close enough to one another to cause them to communicate effectively in order to establish upward drafts of air through the ventilating spaces to ventilate them, whereby moisture between the siding and the sheathing is prevented from destroying the paint on the siding.

14. A building construction comprising a wall sheathing, a painted siding constituted of material that is permeable to moisture mounted on the wall sheathing, and means separating portions of the siding from the wall sheathing at each of a plurality of vertically spaced points of the building, but not at points other than the said vertically spaced points, in order to provide vertically spaced ventilating spaces between the said portions of the siding and the wall sheathing at the vertically spaced points, but not at the said other points, the siding being open to the atmosphere at additional points between the vertically spaced points in order to permit the entry of ventilating air between the wall sheathing and the siding at the additional points, and the vertically spaced points and the said additional points being spaced close enough to one another to cause them to communicate effectively in order to establish upward drafts of air through the ventilating spaces to ventilate them, whereby moisture between the siding and the sheathing is prevented from destroying the paint on the siding.

15. A method of providing ventilation between a wall sheathing and a painted siding constituted of material that is permeable to moisture mounted on the wall sheathing of a completed building that comprises separating portions of the siding from the wall sheathing at each of a plurality of vertically spaced points of the completed building in order to provide vertically spaced ventilating spaces between the said portions of the siding and the wall sheathing at the vertically spaced points, opening the siding to the atmosphere at additional points between the vertically spaced points to permit the entry of ventilating air between the wall sheathing and the siding through the opened portions of the siding at the additional points, and spacing the vertically spaced points and the additional points adjacent thereto close enough to one another to cause them to communicate effectively in order to establish upward drafts of air by way of the additional points, through the opened portions of the siding, and through the vertically spaced ventilating spaces, to ventilate the ventilating spaces, whereby moisture between the siding and the sheathing is prevented from destroying the paint on the siding.

16. A method of providing ventilation between a wall sheathing and a painted siding of lapped clapboards constituted of material that is permeable to moisture mounted on the wall sheathing of a completed building that comprises separating portions of the clapboards from the wall sheathing at each of a plurality of vertically spaced points of the completed building in order to provide vertically spaced ventilating spaces between the said portions of the clapboards and the wall sheathing at the vertically spaced points, and establishing upward drafts of air through the ventilating spaces to ventilate the ventilating spaces, whereby moisture between the siding and the sheathing is prevented from destroying the paint on the siding.

17. A method of providing ventilation between a wall sheathing and a painted siding of lapped clapboards constituted of material that is permeable to moisture mounted on the wall sheathing that comprises separating portions of the clapboards from the wall sheathing to provide substantially non-horizontally disposed continuous ventilating spaces between the said portions of the clapboards and the wall sheathing, and establishing upward drafts of air through the ventilating spaces to ventilate them, whereby moisture between the siding and the sheathing is prevented from destroying the paint on the siding.

18. A building construction comprising a wall sheathing, a painted siding constituted of material that is permeable to moisture mounted on the wall sheathing, means separating portions of the siding from the wall sheathing to provide substantially non-horizontally disposed continuous ventilating spaces between the said portions of the siding and the wall sheathing, and means for establishing upward drafts of air through the ventilating spaces to ventilate them, whereby moisture between the siding and the sheathing is prevented from destroying the paint on the siding.

19. A method of providing ventilation between a wall sheathing and a painted siding of lapped clapboards constituted of material that is permeable to moisture mounted on the wall sheathing of a building that comprises separating portions of the clapboards from the wall sheathing at each of a plurality of vertically spaced points of the building but not at points other than the said vertically spaced points, in order to provide vertically spaced ventilating spaces between the said portions of the clapboards and the wall sheathing at the vertically spaced points, but not at the said other points, and establishing upward drafts of air through the ventilating spaces to ventilate them, whereby moisture between the siding and the sheathing is prevented from destroying the paint on the siding.

20. A building construction comprising a wall sheathing, a painted siding of lapped clapboards constituted of material that is permeable to moisture mounted on the wall sheathing, means separating portions of the clapboards from the wall sheathing at each of a plurality of vertically spaced points of the building, but not at points other than the said certically spaced points, in order to provide vertically spaced ventilating spaces between the said portions of the clapboards and the wall sheathing at the vertically spaced points, but not at the said other points, and means for establishing upward drafts of air through the ventilating spaces to ventilate them, whereby moisture between the siding and the sheathing is prevented from destroying the paint on the siding.

References Cited by the Examiner

UNITED STATES PATENTS

| 2,634,463 | 4/53 | Jarvie | 20—4 |
| 2,645,824 | 7/53 | Titsworth | 20—4 |
| 2,664,809 | 6/54 | Morell | 20—4 |
| 2,703,911 | 3/55 | Griffin | 20—4 |
| 2,823,426 | 2/58 | Dunlap | 50—240 |

FOREIGN PATENTS 251,824    9/48    Switzerland.

HENRY C. SUTHERLAND, *Primary Examiner.*

WILLIAM I. MUSHAKE, JACOB L. NACKENOFF, *Examiners.*